(12) United States Patent
Wang

(10) Patent No.: US 8,402,633 B2
(45) Date of Patent: Mar. 26, 2013

(54) METHOD FOR REPAIRING SELF-PIERCING RIVETED WORKPIECES

(75) Inventor: Pei-Chung Wang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 12/814,146

(22) Filed: Jun. 11, 2010

(65) Prior Publication Data

US 2011/0302755 A1 Dec. 15, 2011

(51) Int. Cl.
B23P 11/00 (2006.01)
B23P 19/00 (2006.01)

(52) U.S. Cl. .............. 29/525.06; 29/243.53; 29/524.1; 29/798

(58) Field of Classification Search .......... 29/798, 29/524.1, 525.06, 243.53
See application file for complete search history.

(56) References Cited

U.S. PATENT DOCUMENTS

| | | | |
|---|---|---|---|
| 5,722,144 A * | 3/1998 | Bora ........................... 29/402.05 |
| 5,752,305 A * | 5/1998 | Cotterill et al. ............... 29/432.2 |
| 6,338,601 B1 * | 1/2002 | Mauer et al. ................... 411/503 |
| 6,568,062 B1 * | 5/2003 | Opper et al. ................... 29/426.5 |
| 7,028,380 B2 * | 4/2006 | Donovan et al. ............ 29/402.01 |
| 7,043,826 B2 | 5/2006 | Naito |
| 7,043,828 B2 * | 5/2006 | Fang et al. ....................... 29/830 |
| 7,412,869 B2 * | 8/2008 | Kato ................................. 72/462 |
| 7,596,858 B2 * | 10/2009 | Opper .............................. 29/716 |
| 7,870,656 B2 * | 1/2011 | Eberlein ...................... 29/525.14 |
| 8,087,298 B1 * | 1/2012 | DiMambro et al. ............. 73/629 |
| 2003/0201306 A1 * | 10/2003 | McTernan et al. ........ 228/112.1 |
| 2004/0050907 A1 * | 3/2004 | Dracup et al. ............ 228/112.1 |
| 2004/0060958 A1 * | 4/2004 | Kondo ............................. 227/51 |
| 2004/0216304 A1 * | 11/2004 | Naito ............................... 29/798 |
| 2005/0019137 A1 * | 1/2005 | Iwatsuki et al. ............... 411/501 |
| 2007/0044292 A1 * | 3/2007 | Stevenson et al. ........... 29/524.1 |
| 2007/0187469 A1 * | 8/2007 | Chen et al. ................. 228/112.1 |
| 2008/0149256 A1 | 6/2008 | Wang et al. |
| 2010/0018027 A1 * | 1/2010 | Stevenson et al. ........ 29/525.06 |
| 2010/0173123 A1 * | 7/2010 | Zardus et al. ................. 428/137 |
| 2011/0248070 A1 * | 10/2011 | Furfari et al. ............. 228/112.1 |

FOREIGN PATENT DOCUMENTS

| CN | 201027754 Y | 2/2008 |
|---|---|---|
| JP | 2002364617 A | 12/2002 |
| JP | 2008267594 A | 11/2008 |

\* cited by examiner

*Primary Examiner* — Derris Banks
*Assistant Examiner* — Anthony Green
(74) *Attorney, Agent, or Firm* — Ingrassia Fisher & Lorenz, P.C.

(57) ABSTRACT

A method is disclosed for repairing a workpiece having two metal components riveted together. The workpiece has a discrepant joint caused by an improperly-installed-self-piercing rivet. The method includes, but is not limited to providing a repair rivet, positioning the repair rivet proximate the discrepant joint such that the repair rivet is substantially aligned with the improperly-installed-self-piercing rivet, and installing the repair rivet at substantially a same location on the workpiece as the improperly-installed-self-piercing rivet without removing the improperly-installed-self-piercing rivet.

18 Claims, 6 Drawing Sheets

METHOD FOR REPAIRING SELF-PIERCING RIVETED WORKPIECES

TECHNICAL FIELD

The technical field generally relates to self-piercing riveted workpieces, and more particularly relates to methods for repairing self-piercing riveted workpieces.

BACKGROUND

Many articles of manufacture require that metal members be attached to one another to form various structures. The fuselage of an aircraft and the body of an automobile are examples of such structures that are fabricated by joining one or more metal members. There are many different ways of joining metal members together, one of which involves the use of metal rivets which form a mechanical connection between the two metal members.

There are many different types of rivets that can be used to join metal members together. One type of rivet is a self-piercing rivet. Self-piercing rivets typically have a head and a shaft that is hollow along at least an end portion opposite the head. In some embodiments, the end portion is sharpened to permit the self-piercing rivet to pierce metal members.

In a conventional procedure, the sharpened end portion is placed against two (or more) stacked metal members (the "workpiece") and driven into the workpiece by a punch. A die, having a protrusion, is placed opposite the punch below the workpiece. As the self-piercing rivet is driven towards the die, the sharpened end portion pierces completely through the first metal member and partially through the second metal member. At the same time, the protrusion on the die causes the second metal member to deform outwardly towards the self-piercing rivet. This causes the self-piercing rivet to deform at its end portion, creating an upset or bent portion that secures the self-piercing rivet to the workpiece and the metal members to one another.

If an unsuitable die is used during this process or if the self-piercing rivet is not properly aligned with the die, an improperly joined or discrepant joint may be formed. For example, in some cases, the self-piercing rivet may not be driven completely through the first metal member. In other cases, only a part of the end portion may be driven into the second member. In still other cases, the end portion of the self-piercing rivet may not be properly upset. In these cases, the self-piercing rivet will fail to properly join the stacked metal members or it may lack the robust connection that would have resulted had the die and the self-piercing rivet been properly aligned.

Solutions to this issue involve removing the improperly-installed-self-piercing rivet from the workpiece and installing a new self-piercing rivet at either the same location on the workpiece, or at a nearby location. Repairing discrepant joints in this manner, while adequate, can be difficult, time consuming, costly, and can risk damaging the workpiece.

SUMMARY

Improved methods are provided herein for repairing a self-piercing riveted workpiece.

In an example, the method includes, but is not limited to, providing a repair rivet, positioning the repair rivet proximate the discrepant joint such that the repair rivet is substantially aligned with the improperly-installed-self-piercing rivet, and installing the repair rivet at substantially a same location on the workpiece as the improperly-installed-self-piercing rivet without removing the improperly-installed-self-piercing rivet.

In another example, the method includes, but is not limited to providing a blind rivet assembly that includes a blind rivet and a mandrel extending through the blind rivet. The method further includes drilling through the improperly-installed-self-piercing rivet to form a hole. The method further includes inserting the blind rivet assembly into the hole. The method further includes pulling the mandrel to create an upset portion of the blind rivet that engages the improperly-installed-self-piercing rivet.

In yet another example, the method further includes, but is not limited to, providing a self piercing rivet. The method further includes positioning the self piercing rivet at the discrepant joint at a first side of the workpiece opposite a second side of the workpiece where the improperly-installed-self-piercing rivet was installed. The method further includes placing a die over the improperly-installed-self-piercing rivet. The method further includes driving the self-piercing rivet into the first side of the workpiece to create an upset portion that engages the workpiece and that substantially surrounds an embedded end of the improperly-installed-self-piercing rivet.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Figure 1:
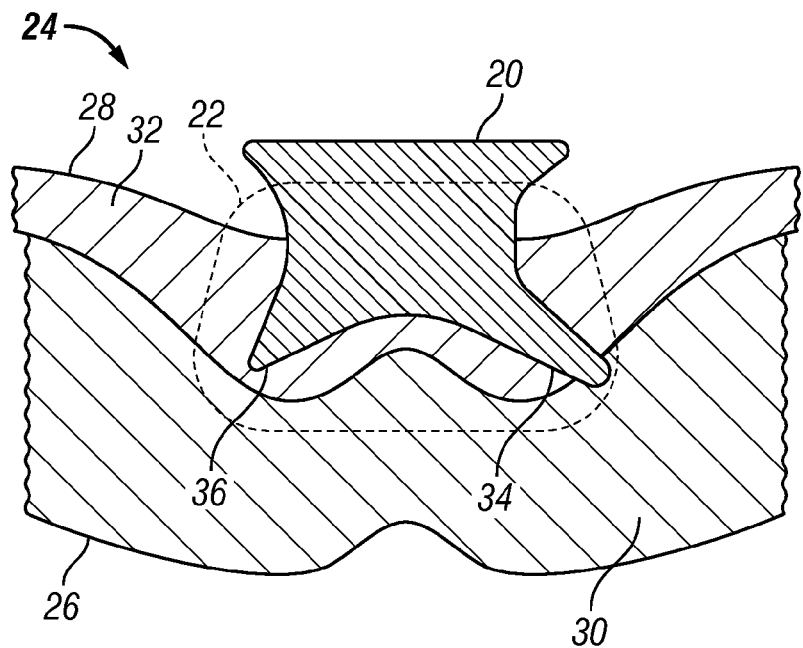
FIG. 1 is a simplified cross-sectional view of an improperly-installed-self-piercing rivet and a discrepant joint formed thereby in a workpiece.

FIG. 1 is a simplified cross-sectional view of an improperly-installed-self-piercing rivet 20 and a discrepant joint 22 formed thereby in a workpiece 24. Workpiece 24 is a metal structure having a first side 26 and a second side 28. Workpiece 24 may be joined with other workpieces (not shown) to construct any desirable structure. Examples of such structures include, but are not limited to, aircraft fuselages, ship hulls, and structural components on automobiles.

Workpiece 20 is comprised of a first metal member 30 and a second metal member 32. First metal member 30 and second metal member 32 are generally planar members that have overlapping portions which are riveted together with self-piercing rivets. As illustrated, improperly-installed-self-piercing rivet 20 has only partially penetrated through second metal member 32. A first upset portion 34 has penetrated completely through second metal member 32 and has partially penetrated through first metal member 30. First upset portion 34 is curved in a manner that engages first metal member 30 and that mechanically joins first metal member 30 to second metal member 32. However, a second upset portion 36 has not penetrated completely through second metal member 32 and therefore does not mechanically join second metal member 32 with first metal member 30.

The failure of second upset portion 36 to engage with first metal member 30 causes the joint to be discrepant. Various methods of repairing discrepant joints will be discussed below.

Figure 2:
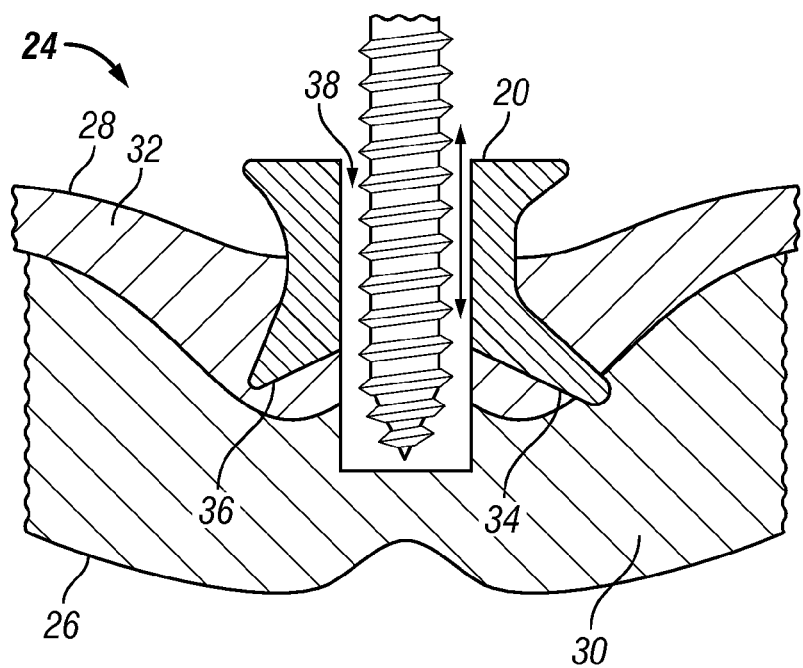
FIG. 2 is a simplified cross-sectional view illustrating drilling a hole in the improperly-installed-self-piercing rivet that extends through a portion of the workpiece.

FIG. 2 is a simplified cross-sectional view illustrating drilling a hole 38 in improperly-installed-self-piercing rivet 20 that extends through a portion of workpiece 24. In the illustrated example, hole 38 is drilled through an approximate center of improperly-installed-self-piercing rivet 20. In other examples, hole 38 may be drilled through any suitable portion of improperly-installed-self-piercing rivet 20, and at any suitable angle. Hole 38 extends completely through improperly-installed-self-piercing rivet 20, completely through second metal member 32 and partially through first metal member 30.

Figure 3:
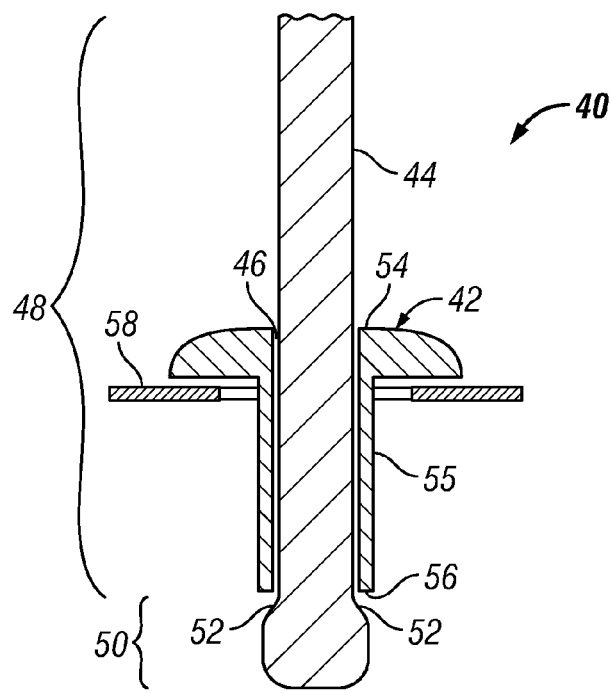
FIG. 3 is a simplified cross-sectional view illustrating a blind rivet assembly including a blind rivet and a mandrel.

FIG. 3 is a simplified cross-sectional view illustrating a blind rivet assembly 40 (also referred to herein as a repair rivet) including a blind rivet 42 and a mandrel 44. A hole 46 extends longitudinally completely through blind rivet 42. Hole 46 is configured to receive a shaft portion 48 of mandrel 44 and to permit mandrel 44 to slide inwardly and outwardly with respect to blind rivet 42. Mandrel 44 includes a head portion 50 having a diameter that is larger than a diameter of shaft portion 48. An upper area 52 of head portion 50 is configured to meet shaft portion 48 at an obtuse angle.

Blind rivet 42 includes a head portion 54, a shaft portion 55, and an annular end portion 56. Head portion 50 of mandrel 44 has a larger diameter than annular end portion 56 and is therefore obstructed from movement into hole 46. A sealant 58, in the form of a washer, is placed around an outer portion of shaft portion 55. Sealant 58 may be made of any suitable material, including, but not limited to, metal, rubber and polymeric materials. In some embodiments, sealant 58 may be an adhesive and in other embodiments, sealant 58 may be a bonding material that is configured to be cured through the application of heat, ultra-violet light, or by other means.

In a conventional implementation, blind rivet assembly 40 is inserted into an opening or hole in a workpiece. A tool is used to grasp and pull upwardly on shaft portion 48 while simultaneously pushing downwardly on head portion 54, causing head portion 50 of mandrel 44 to press up against annular end portion 56. When a sufficient force is exerted on mandrel 44, the angled upper portion of head 50 causes annular end portion 56 to severely deform and form an upset portion which mechanically engages the workpiece.

Figure 4:
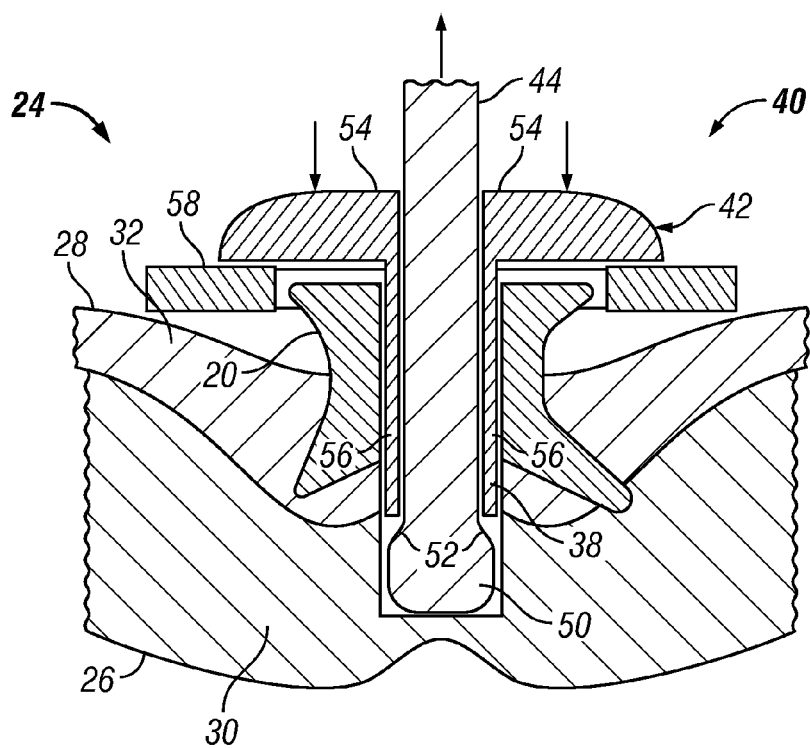
FIG. 4 is a simplified cross-sectional view illustrating insertion of the blind rivet assembly into the hole and pulling on the mandrel.

FIG. 4 is a simplified cross-sectional view illustrating insertion of blind rivet assembly 40 into hole 38 and pulling on mandrel 44. As illustrated, blind rivet assembly 40 is sized to extend far into hole 38 by a distance that permits annular end portion 56 to reside within first metal member 30. Mandrel 44 is pulled in an upward direction as a downward or bracing force is applied on head portion 54. This combination of forces drives the angled upper portion of head 52 into annular end portion 56.

Figure 5:
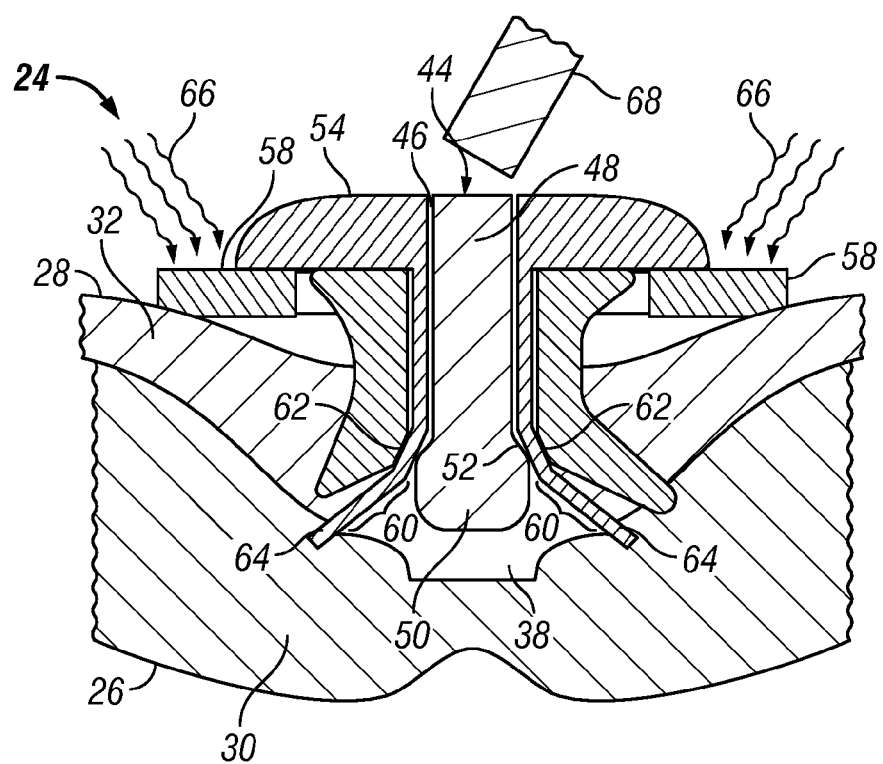
FIG. 5 is a simplified cross-sectional view illustrating the creation of an upset portion of the blind rivet and engagement of the upset portion with the workpiece and with the improperly-installed-self-piercing rivet.

FIG. 5 is a simplified cross-sectional view illustrating the creation of an upset portion 60 of blind rivet 42 and engagement of upset portion 60 with workpiece 24 and with improperly-installed-self-piercing rivet 20. Head portion 50 of mandrel 44 has been driven upwards into hole 46 in blind rivet 42 causing the annular end portion to rupture and form upset portions 60. Upset portion 60 engages with improperly-installed-self-piercing rivet 20 at engagement area 62 and with first metal member 30 at engagement area 64. In this manner, upset portion 60 strengthens the connection between first metal member 30 and second metal member 32, thus repairing the discrepant joint. It should be understood that the illustration, and in particular, upset portion 60, has been exaggerated for the purposes of illustration.

The force acting downwardly on head portion 54 of blind rivet 42 has driven blind rivet 42 further into workpiece 24. This, in turn, has permitted sealant 58 to compress against second side 28 to form a water tight seal around blind rivet 42. Additionally, sealant 58 is cured by the application of heat energy 66 to sealant 58. A top portion 68 has been severed from shaft portion 48. As a result, an upper surface of the remaining portion of mandrel 44 is generally flush with an upper end of head portion 54 of blind rivet 42. Top portion 68 may be severed by any suitable means including, but not limited to, the use of bolt cutters, wire cutters, a blow torch or any other tool effective to cut through mandrel 44.

A slightly different implementation of the above method is discussed below in conjunction with FIGS. 6-8.

Figure 6:
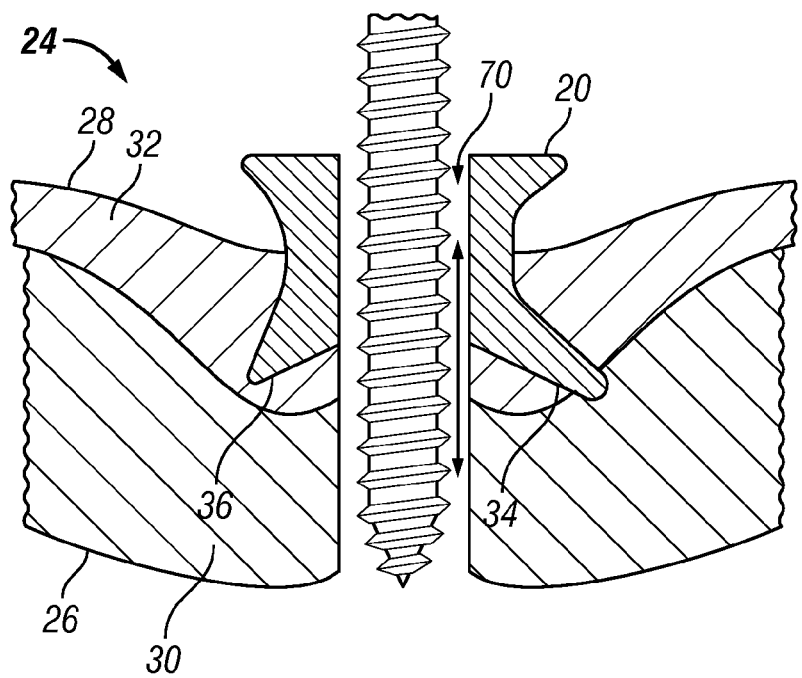
FIG. 6 is a simplified cross-sectional view illustrating drilling a hole in the improperly-installed-self-piercing rivet that extends completely through the workpiece.

FIG. 6 is a simplified cross-sectional view illustrating drilling a hole 70 in improperly-installed-self-piercing rivet 20 that extends completely through workpiece 24. In the illustrated example, hole 70 is drilled through the center of improperly-installed-self-piercing rivet 20. In other examples, hole 70 may be drilled through any suitable portion of improperly-installed-self-piercing rivet 20, and at any suitable angle. Hole 70 extends completely through improperly-installed-self-piercing rivet 20, completely through second metal member 32 and completely through first metal member 30.

Figure 7:
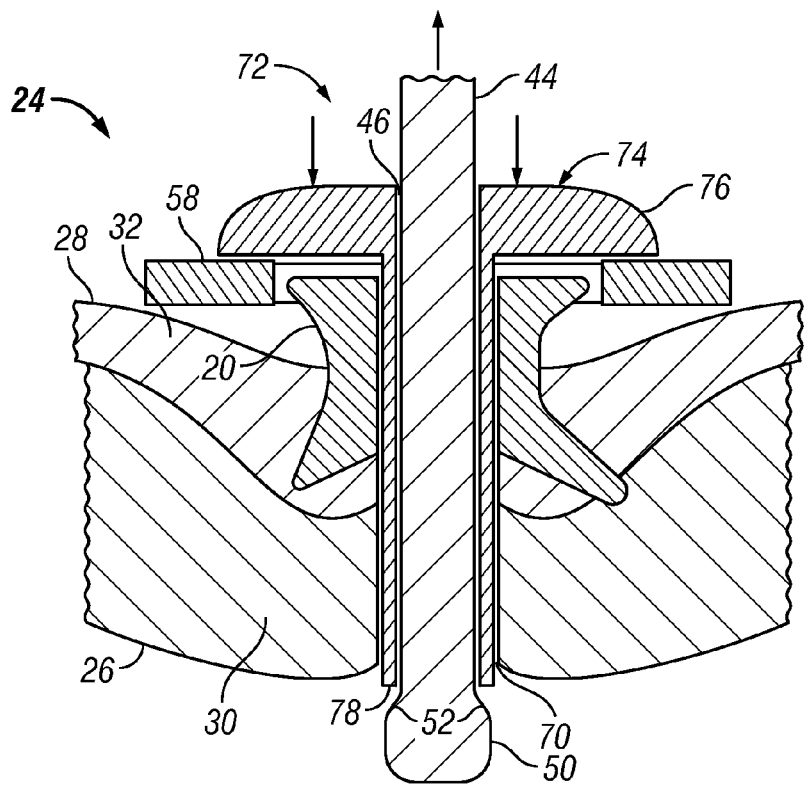
FIG. 7 is a simplified cross-sectional view illustrating insertion of the blind rivet assembly into the hole and pulling on the mandrel.

FIG. 7 is a simplified cross-sectional view illustrating insertion of a blind rivet assembly 72 into hole 70 and pulling on mandrel 44. Blind rivet assembly 72 is very similar to blind rivet assembly 40, the only difference being that blind rivet assembly 72 includes a blind rivet 74 that has a length that permits it to extend completely through hole 70 and protrude beyond first side 26 of first metal member 30. Blind rivet 74 includes a head portion 76 and an annular end portion 78. Mandrel 44 is pulled in an upward direction while a downward or bracing force is applied in a downward direction on head 76. This combination of forces causes head portion 50 of mandrel 44 to push in an upward direction against annular end portion 78. Upper portions 52 of head portion 50 engage annular end portion 78. Upper portions 52 are angled and act as a camming surface forcing annular end portion 78 to expand in an outward direction. When mandrel 44 is pulled hard enough, annular end portion 78 will rupture and form an upset portion of blind rivet 74.

Figure 8:
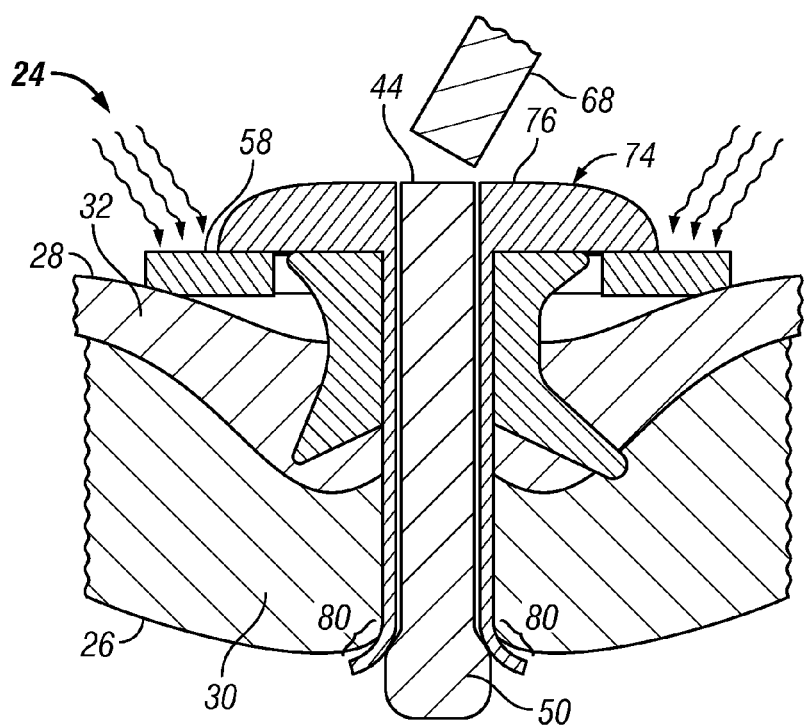
FIG. 8 is a simplified cross-sectional view illustrating the creation of an upset portion of the blind rivet and engagement of the upset portion with an external surface of the workpiece.

FIG. 8 is a simplified cross-sectional view illustrating the creation of an upset portion 80 of blind rivet 74 and engagement of upset portion 80 with first side 26 of workpiece 24. As illustrated, upset portion 80 has bent in a generally outward direction with respect to a longitudinal axis of mandrel 44. The curvature of upset portion 80 has caused upset portion 80 to engage first side 26 and to exert an upward force on first metal member 30. An underside of head portion 76 similarly pushes down on second metal member 32 through engagement with improperly-installed-self-piercing rivet 20. The combination of the upward force acting on first metal member 30 and the downward force acting on second metal member 32 places workpiece 24 in compression and effectively repairs the discrepant joint.

Another embodiment of a method for repairing a discrepant joint caused by an improperly-installed-self-piercing rivet is discussed in conjunction with FIGS. 9-12, below.

Figure 9:
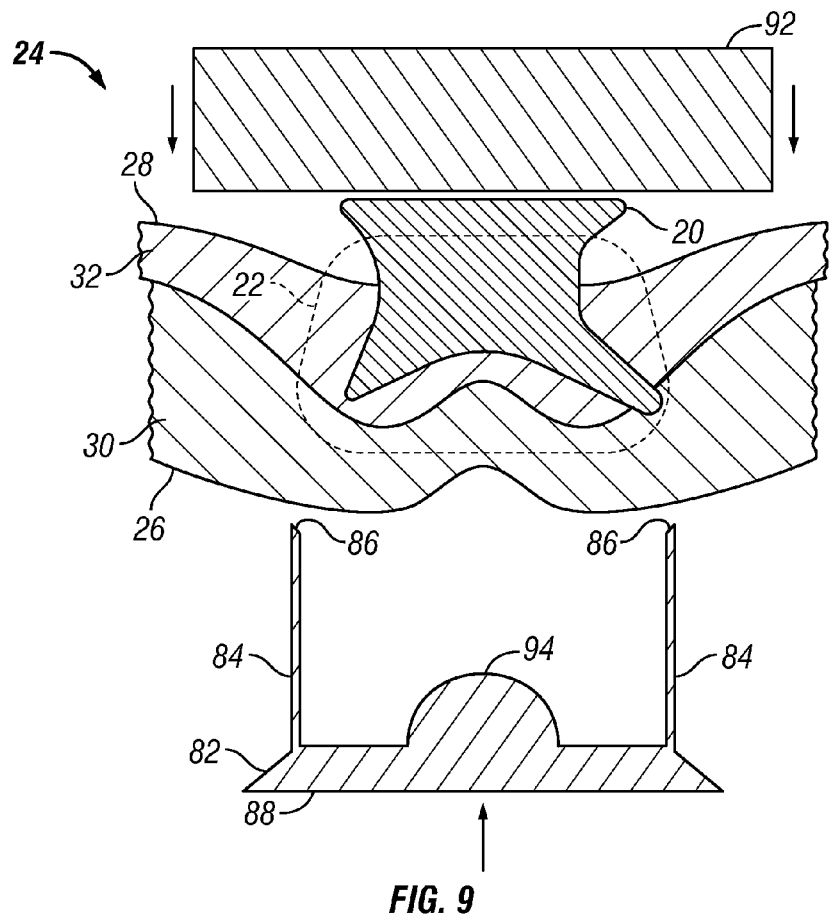
FIG. 9 is a simplified cross-sectional view illustrating the positioning of a self-piercing rivet at the discrepant joint and aligning it with the improperly-installed-self-piercing rivet.

FIG. 9 is a simplified cross-sectional view illustrating the positioning of a self-piercing rivet 82 at discrepant joint 22 and aligning it with improperly-installed-self-piercing rivet 20. Self-piercing rivet 82 includes a generally cylindrical shaft portion 84 having sharpened annular end 86, a head portion 88 and a protrusion 94. Sharpened annular end 86 is configured to pierce through workpiece 24 when a sufficient force is applied on head portion 88.

Self-piercing rivet 82 is positioned against first side 26 of workpiece 24 at a location that is opposite to, and which aligns with, improperly-installed-self-piercing rivet 20. As illustrated, shaft portion 84 has an inner diameter that exceeds an outer diameter of improperly-installed-self-piercing rivet 20. Consequently, when self-piercing rivet 82 is driven into workpiece 24, a portion of shaft portion 84 will generally surround improperly-installed-self-piercing rivet 20.

A die 92 is positioned against improperly-installed-self-piercing rivet 20 and will brace or push improperly-installed-self-piercing rivet 20 in a downward direction as a punch or other tool applies an upward force on head portion 88 of self-piercing rivet 82.

Self-piercing rivet 82 also includes a protrusion 94 protruding from head portion 88 in the same direction as shaft portion 84. When self-piercing rivet 82 is driven into a metal member, protrusion 94 causes the metal material of the workpiece to move or flow away from protrusion 94 and towards an inner wall of shaft portion 84. This, in turn, causes shaft portion 84 to deform and form upset portions that curve away from protrusion 94. The curvature of the upset portions results in mechanical engagement with work piece.

Figure 10:
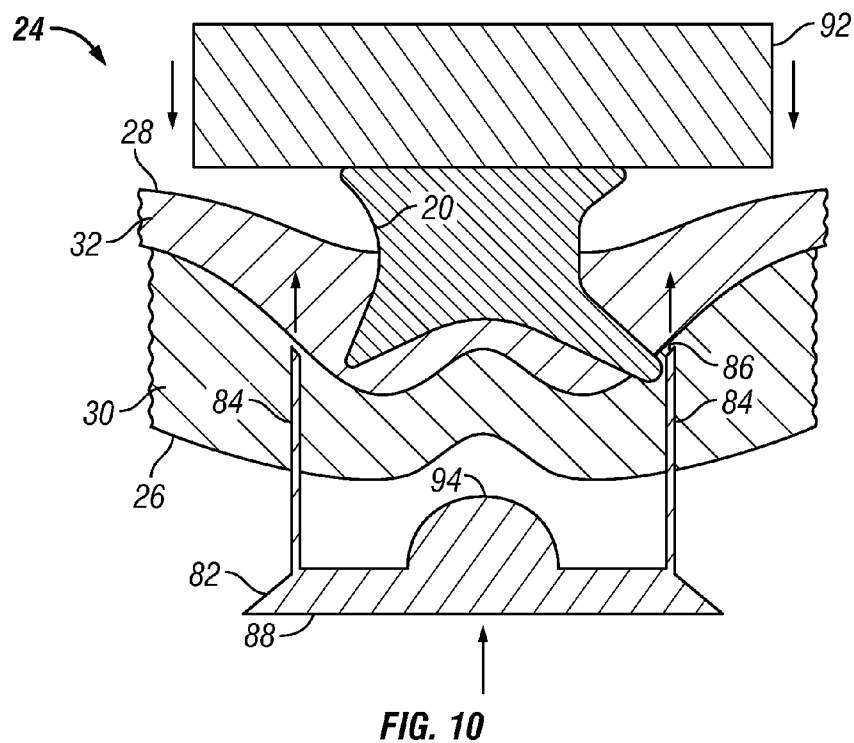
FIG. 10 is a simplified cross-sectional view illustrating an early stage of driving the self piercing rivet into the discrepant joint.

FIG. 10 is a simplified cross-sectional view illustrating an early stage of driving self-piercing rivet 82 into the discrepant joint. Die 92 compresses against a top side of improperly-installed-self-piercing rivet 20 while a punch (not shown) drives self-piercing rivet 82 into workpiece 24. At the stage illustrated in FIG. 10, protrusion 94 has not yet made contact with workpiece 24 and shaft portion 84 is driving straight in to workpiece 24.

Figure 11:
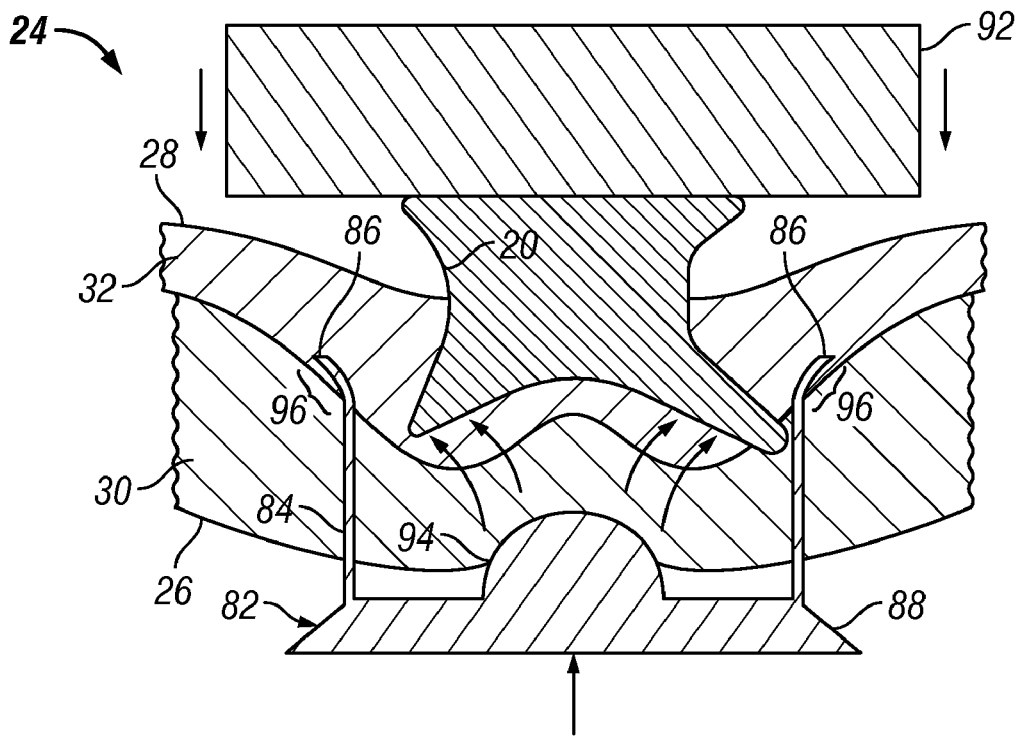
FIG. 11 is a simplified cross-sectional view illustrating an intermediate stage of driving the self piercing rivet into the discrepant joint.

FIG. 11 is a simplified cross-sectional view illustrating an intermediate stage of driving self-piercing rivet 82 into the discrepant joint. At the stage illustrated in FIG. 11, protrusion 94 has begun to intrude into workpiece 24. As protrusion 94 enters workpiece 24, the metal material of first metal member 30 begins to migrate away from protrusion 94 and pushes against the internal surface of shaft portion 84, causing it to deform and to form upset portions 96. As protrusion 94 protrudes further into workpiece 24, upset portions 96 will grow in length and will curve further outwardly.

Figure 12:
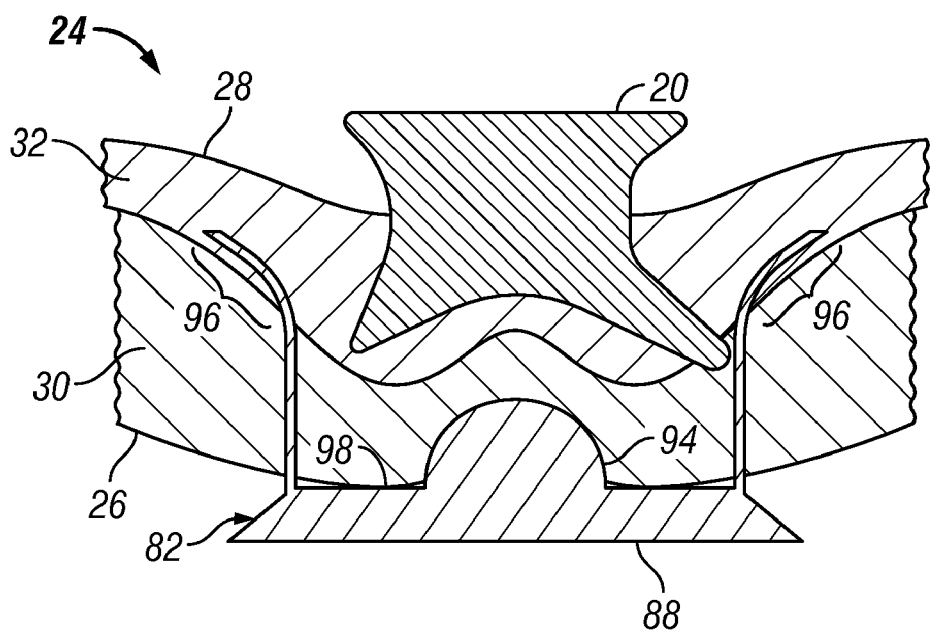
FIG. 12 is a simplified cross-sectional view illustrating a final stage of driving the self piercing rivet into the discrepant joint.

FIG. 12 is a simplified cross-sectional view illustrating a final stage of driving the self-piercing rivet 82 into the discrepant joint. An underside surface 98 of head portion 88 is substantially flush with first side 26 of workpiece 24. Protrusion 94 is completely submerged within the metal material of workpiece 24 and upset portions 96 have curved into an engaging relationship with second metal member 32. As a result, first metal member 30 and second metal member 32 are joined together and the discrepant joint has been repaired.

The embodiment of the method illustrated in FIGS. 9-12 is not limited to repairing discrepant joints. Rather, this embodiment may also be used join together disparate metal members such as first metal member 30 and second metal member 32. This method offers a significant advantage over prior art self-piercing rivets. Prior art methods for joining metal members using self-piercing rivets typically require that a special die geometry (pip and height) be determined for each die and sheet gage combination. Determining an appropriate or optimum combination requires a significant amount of effort and consumes a substantial amount of time. The embodiment of the method illustrated in FIGS. 9-12, however, does not require any special die geometry. Rather, when using self-piercing rivet 82 (or other similar self-piercing rivets that include a protrusion such as protrusion 94), only a single flat die is required to implement the method.

With respect to each of the embodiments illustrated in FIGS. 1-12, although the related discussion centers around repairing discrepant joints in metal members, it should be understood, that these methods may also be implemented with other materials as well. These methods may be applied to discrepant joints in workpieces made from any material which would spring back.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for repairing a self-piercing riveted workpiece having a discrepant joint caused by an improperly-installed-self-piercing rivet, the method comprising the steps of:
   providing a repair rivet;
   positioning the repair rivet proximate the discrepant joint such that the repair rivet is substantially aligned with the improperly-installed-self-piercing rivet; and
   installing the repair rivet at substantially a same location on the workpiece as the improperly-installed-self-piercing rivet without removing the improperly-installed-self-piercing rivet and such that an end portion of the repair rivet directly engages an internal portion of the work piece.

2. The method of claim 1, further comprising the step of positioning the repair rivet adjacent the discrepant joint and substantially centered over the improperly-installed-self-piercing rivet.

3. The method of claim 1, further comprising the step of applying a sealant between the workpiece and the repair rivet.

4. The method of claim 1, wherein the positioning step includes centering the repair rivet over the improperly-installed-self-piercing rivet.

5. A method for repairing a self-piercing riveted workpiece having a discrepant joint caused by an improperly-installed-self-piercing rivet, the method comprising the steps of:
    providing a blind rivet assembly including a blind rivet and a mandrel extending through the blind rivet;
    drilling through the improperly-installed-self-piercing rivet to form a hole;
    inserting the blind rivet assembly into the hole; and
    pulling the mandrel to create an upset portion of the blind rivet that engages the improperly-installed-self-piercing rivet and that further directly engages an internal portion of the work piece.

6. The method of claim 5, further comprising the steps of providing a sealant and positioning the sealant between the blind rivet and the workpiece.

7. The method of claim 6, further comprising the step of curing the sealant.

8. The method of claim 5, wherein the drilling step comprises drilling through an approximate center of the improperly-installed-self-piercing rivet.

9. The method of claim 5, further comprising the step of severing an end of the mandrel.

10. The method of claim 9, wherein the severing step comprises severing the end such that a remaining portion of the mandrel is substantially flush with an upper end of the blind rivet.

11. The method of claim 5, further comprising the steps of providing an sealant, positioning the sealant between the blind rivet and the workpiece, and curing the sealant, wherein the drilling step includes drilling through a portion of the workpiece, wherein the blind rivet has a length sufficient to extend beyond an end of the improperly-installed-self-piercing rivet when the blind rivet is inserted into the hole, and wherein the pulling step causes the upset portion to engage the workpiece.

12. The method of claim 11, further comprising the step of severing an end portion of the mandrel.

13. The method of claim 12, wherein the severing step comprises severing the end of the mandrel such that a remaining portion of the mandrel is substantially flush with an upper end of the blind rivet.

14. A method for repairing a self-piercing riveted workpiece having a discrepant joint caused by an improperly-installed-self-piercing rivet, the method comprising the steps of:
    providing a self-piercing rivet;
    positioning the self-piercing rivet at the discrepant joint at a first side of the workpiece opposite a second side of the workpiece where the improperly-installed-self-piercing rivet was installed;
    placing a die over the improperly-installed-self-piercing rivet;
    driving the self-piercing rivet into the first side of the workpiece to create an upset portion that engages the workpiece and that substantially surrounds an embedded end of the improperly-installed-self-piercing rivet.

15. The method of claim 14, wherein the self-piercing rivet has a head and a protrusion under the head, and wherein the driving step comprises driving the self-piercing rivet into the first side of the workpiece until the protrusion is disposed below the first side of the workpiece.

16. The method of claim 15, wherein the positioning step comprises positioning the self-piercing rivet such that the protrusion is substantially aligned with the embedded end of the improperly-installed-self-piercing rivet.

17. The method of claim 15, wherein the driving step comprises driving the self-piercing rivet into the workpiece until an underside of the head is substantially flush with the first side of the workpiece.

18. The method of claim 17, wherein the positioning step comprises positioning the self-piercing rivet such that the protrusion is substantially aligned with the embedded end of the improperly-installed-self-piercing rivet.

* * * * *